United States Patent
Ota et al.

(10) Patent No.: US 7,572,839 B2
(45) Date of Patent: *Aug. 11, 2009

(54) SEAL RING AND SEAL DEVICE

(75) Inventors: Tomohito Ota, Yokohama (JP); Tomihito Hashimoto, Tokyo (JP); Yasuaki Yamamoto, Tokyo (JP); Hiroo Kusano, Tokyo (JP)

(73) Assignees: Nissan Motor Co., Ltd., Yokohama-shi (JP); Hitachi Cable, Ltd., Tokyo (JP)

( * ) Notice: Subject to any disclaimer, the term of this patent is extended or adjusted under 35 U.S.C. 154(b) by 529 days.

This patent is subject to a terminal disclaimer.

(21) Appl. No.: 10/574,216

(22) PCT Filed: Sep. 29, 2004

(86) PCT No.: PCT/JP2004/014700

§ 371 (c)(1),
(2), (4) Date: Mar. 31, 2006

(87) PCT Pub. No.: WO2005/033551

PCT Pub. Date: Apr. 14, 2005

(65) Prior Publication Data

US 2007/0075502 A1    Apr. 5, 2007

(30) Foreign Application Priority Data

Oct. 2, 2003    (JP)    ............... 2003-344103

(51) Int. Cl.
  *C08F 2/46*    (2006.01)
  *B29C 35/00*    (2006.01)
  *B29C 35/08*    (2006.01)

(52) U.S. Cl. ............ 522/156; 522/155; 522/109; 522/150; 522/110; 522/111; 522/112; 522/184; 522/185; 522/187; 264/330; 264/331.11; 264/331.14; 264/331.15; 525/178

(58) Field of Classification Search .......... 522/109, 522/110, 111, 112, 156, 150, 155; 524/546, 524/429, 551, 545, 440; 264/330, 311.11, 264/311.14; 525/178

See application file for complete search history.

(56) References Cited

U.S. PATENT DOCUMENTS

| 5,223,358 | A | * | 6/1993 | Yamada et al. ............... 430/18 |
| 5,428,096 | A | * | 6/1995 | Fukunaga ................... 524/440 |
| 6,895,208 | B2 | * | 5/2005 | Nakatogawa et al. ....... 399/329 |
| 2003/0189295 | A1 | | 10/2003 | Ota et al. |
| 2004/0131401 | A1 | * | 7/2004 | Nakatogawa et al. ....... 399/328 |

FOREIGN PATENT DOCUMENTS

| EP | 1 000 975 A2 | 5/2000 |
| JP | 01-311155 A | 12/1989 |
| JP | 02-028238 A | 1/1990 |
| JP | 06-051679 U | 7/1994 |
| JP | 11-021408 A | 1/1999 |
| JP | 2001-173795 A | 6/2001 |
| JP | 2001-249558 A | 9/2001 |
| JP | 2002-161981 A | 6/2002 |
| JP | 2002-336356 A | 11/2002 |
| JP | 2003-049950 A | 2/2003 |
| JP | 2004-003581 A | 1/2004 |
| JP | 2004010717 A | * | 1/2004 |
| JP | 2004331814 A | * | 11/2004 |

OTHER PUBLICATIONS

Torlon Product Data Sheet. [online]. Solvay Advanced Polymers, L.L.C., 2005 [retrieved on Jun. 11, 2008]. Retrieved from internet:<URL:http://www.solvaymembranes.com/static/wma/pdf/3/8/4/3/Membrane_matls.pdf>.*

* cited by examiner

*Primary Examiner*—Sanza L McClendon
(74) *Attorney, Agent, or Firm*—Foley & Lardner LLP

(57) ABSTRACT

A seal ring (10) of the present invention seals operating oil hermetically and is attached to an annular seal ring groove (16) provided on an outer circumference of a shaft member (12). The seal ring (10) includes fluororesin, modified fluororesin formed by being irradiated with an ionizing radiation in a range from 1 kGy to 10 MGy inclusive in a state of being heated up to a melting point thereof or higher under an inert gas atmosphere with an oxygen partial pressure of 1.33 kPa or less, and synthetic resin having a surface energy ranging from +0 N/cm to 20~10−5 N/cm inclusive of that of the operating oil.

7 Claims, 5 Drawing Sheets

SEAL RING AND SEAL DEVICE

TECHNICAL FIELD

The present invention relates to a seal ring used for hermetically sealing operating oil of relative rotation portions in an automatic transmission mainly used in an automobile or the like and to a hydraulic seal device using the seal ring.

BACKGROUND ART

Heretofore, an automatic transmission used in a vehicle such as an automobile has included a torque converter, gears, a brake and a multi-plate clutch. The automatic transmission requires a clutch engagement for transmission and adopts a construction in which this clutch engagement is performed by oil pressure. Therefore, sealing is required for relatively rotating portions in a hydraulics circuit, a seal ring is provided in a ring groove in one of members constructing the portions, and the seal ring is designed to slidingly contact the sidewall surface of the ring groove while being thrust on an outer circumference (or inner circumference) of a partner member by the oil pressure.

In recent years, such a seal ring has gradually been changed from a conventional ring made of cast iron to a ring made of synthetic resin which allows closer contact with the partner member and has an excellent sealing property. However, since the seal ring made of synthetic resin has a good contact property, friction torque on a slidingly contacting surface with the partner member is increased. Therefore, various techniques for reducing the friction torque have been employed.

For example, as a technique for reducing the friction torque of the seal ring made of synthetic resin, a method is known, in which fluororesin such as polytetrafluoroethylene excellent in low friction torque property is used for the base material of the seal ring (refer to Japanese Patent Application Laid-Open No. H11-21408).

DISCLOSURE OF THE INVENTION

However, while the fluororesin has an excellent low friction torque property, load-resistant and abrasion-resistant properties thereof are poor. Accordingly, there has been a problem in that deformation and self-abrasion of the seal ring are so increased that it becomes impossible to retain a sealing property thereof in sliding conditions, particularly under high surface pressure where an oil film on a sliding surface is thinned.

The present invention has been accomplished to solve the above problem and it is an object of the present invention to provide a seal ring capable of effectively reducing the friction torque on a sliding surface thereof without damaging the sealing property even during an operation under high pressure, and consequently, contributing to an improvement of fuel consumption of an automobile, and to provide a seal device using the seal ring.

The first aspect of the present invention provides a seal ring which seals operating oil hermetically and is attached to an annular seal ring groove provided on an outer circumference of a shaft member, the seal ring comprising: fluororesin; modified fluororesin formed by being irradiated with an ionizing radiation in a range from 1 kGy to 10 MGy inclusive in a state of being heated up to a melting point thereof or higher under an inert gas atmosphere with an oxygen partial pressure of 1.33 kPa or less; and synthetic resin having a surface energy ranging from +0 N/cm to $20 \times 10^{-5}$ N/cm inclusive of that of the operating oil, wherein the seal ring comprises an inner ring circumferential surface facing an inside thereof in a radius direction, an outer ring circumferential surface facing an outside thereof in the radius direction, and a pair of side ring surfaces facing both sides thereof in an axial direction, and when oil pressure is applied to the seal ring, the outer ring circumferential surface is pressed against an inner circumferential surface of a housing, and one of the side ring surfaces is pressed against a side surface of the seal ring groove, thus retaining the oil pressure.

The second aspect of the present invention provides a hydraulic seal device comprising: a shaft member; a housing which houses the shaft member; and a seal ring which seals operating oil hermetically and is attached to an annular seal ring groove provided on an outer circumference of the shaft member, the seal ring comprising: fluororesin; modified fluororesin formed by being irradiated with an ionizing radiation in a range from 1 kGy to 10 MGy inclusive in a state of being heated up to a melting point thereof or higher under an inert gas atmosphere with an oxygen partial pressure of 1.33 kPa or less; and synthetic resin having a surface energy ranging from +0 N/cm to $20 \times 10^{-5}$ N/cm inclusive of that of the operating oil, wherein the seal ring comprises an inner ring circumferential surface facing an inside thereof in a radius direction, an outer ring circumferential surface facing an outside thereof in the radius direction, and a pair of side ring surfaces facing both sides thereof in an axial direction, and when oil pressure is applied to the seal ring, the outer ring circumferential surface is pressed against an inner circumferential surface of the housing, and one of the side ring surfaces is pressed against a side surface of the seal ring groove, thus retaining the oil pressure, and the seal ring slidingly contacts any of the side surface of the seal ring groove of the shaft member which is nonferrous metal and the inner circumferential surface of the housing which is non ferrous metal.

BEST MODE FOR CARRYING OUT THE INVENTION

A seal ring and hydraulic seal device of the present invention will be described below in detail with reference to the drawings.

Figure 1:
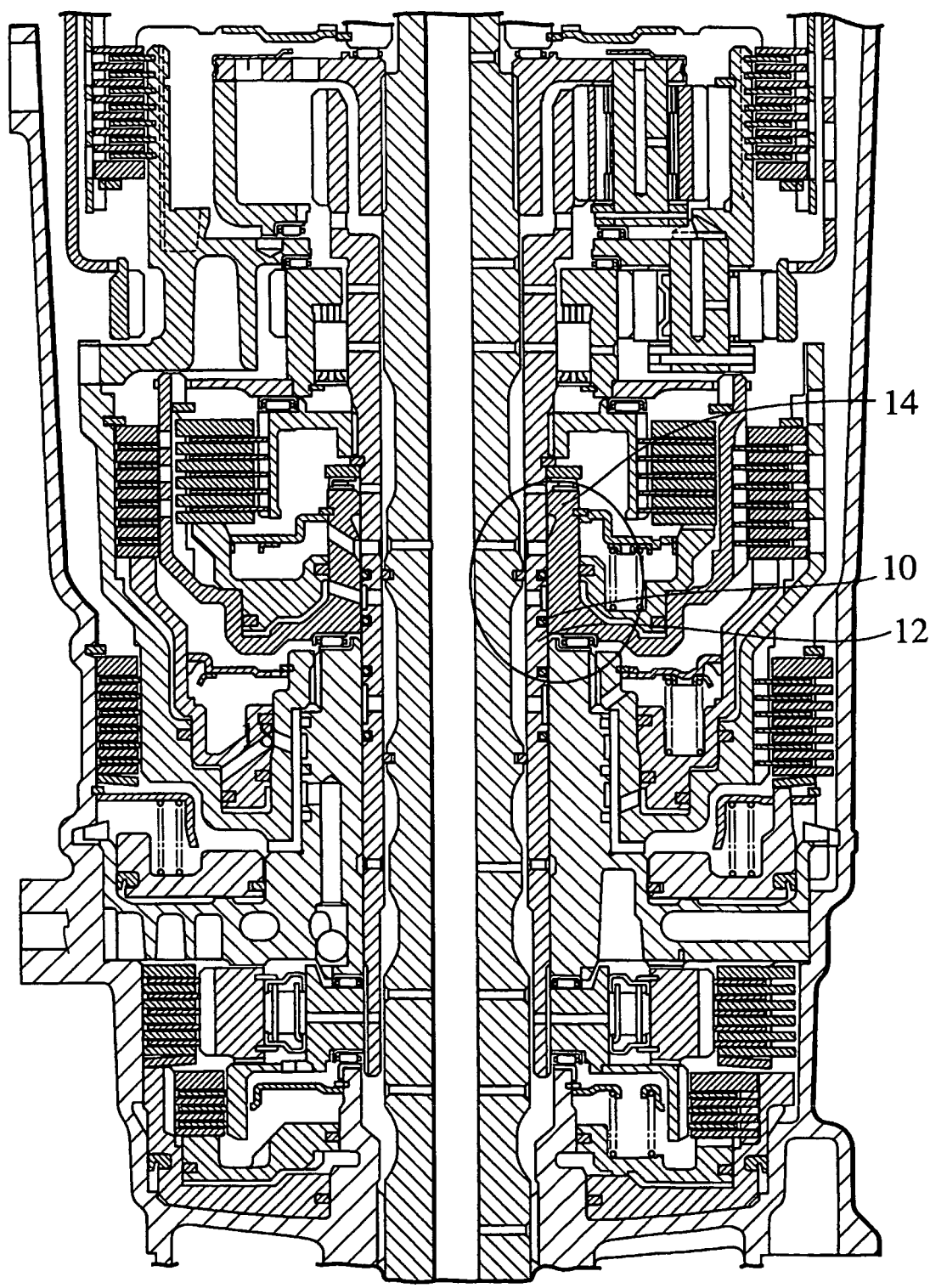
FIG. 1 is a cross-sectional view of a hydraulic seal device of an automatic transmission for a vehicle, to which a seal ring of the present invention can be applied.
Figure 2:
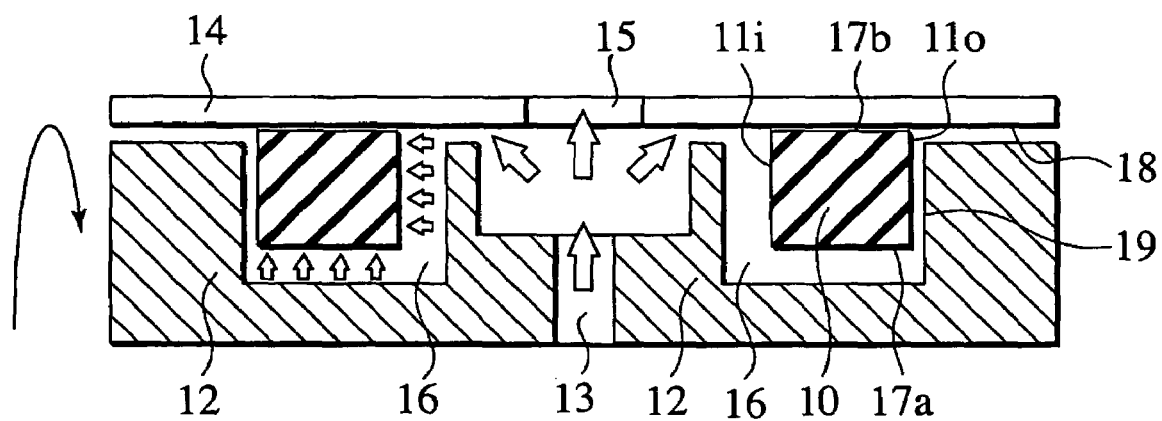
FIG. 2 is a partially enlarged cross-sectional view showing a usage of the seal ring in FIG. 1.

As shown in FIGS. 1 and 2, a seal ring 10 of the present invention is provided in a seal ring groove 16 of a shaft member 12. Moreover, the shaft member 12 is housed in a housing 14, and both thereof are composed of nonferrous metal. When oil pressure is applied to an oil path 15 of the housing 14 from an oil path 13 of the shaft member 12, the oil pressure is also transmitted to each seal ring groove 16 to operate on an inner circumferential surface 17a and an inner side surface 11i of each seal ring 10. Then, the seal ring 10 exerts a sealing effect in such a manner that an outer circumferential surface 17b thereof is pressed against an inner circumferential surface 18 of the housing 14, and that an outer side surface 11o thereof, that is, a sealing surface is pressed against a sealing side surface 19 of the seal ring groove 16.

Friction torque generated between the outer circumferential surface 17b of each seal ring 10 and the inner circumferential surface 18 of the housing 14 is larger than friction torque generated between both of the sealing side surfaces (11o and 19) of the ring 10 and the seal ring groove 16. Therefore, if the housing 14 rotates with respect to the shaft member 12 in the state as described above, then the seal ring 10 rotates accompanied by the housing 14, and a relative rotation motion is generated on both of the sealing side surfaces.

In a seal device having such a construction, if a body of the seal ring is made of synthetic resin, then a contact property thereof with the sealing side surface of the partner member is improved, and therefore, the sealing property is improved. However, the friction torque of the seal ring is increased.

Regarding the above-described matter, as a technique for reducing the friction torque of the seal ring, there exists the method of using fluororesin such as tetrafluoroethylene which has an excellent low friction torque property for the base material of the seal ring. While the fluororesin has such an excellent low friction torque property, the resin has poor abrasion-resistant and load-resistant properties. Therefore, the self-abrasion/deformation of the seal ring is increased under high surface pressure, and thus it becomes impossible to retain the sealing property.

Heretofore, in order to achieve the improvement of the load-resistant property of the fluororesin, generally, a fiber filler material such as glass fiber and carbon fiber has been added thereto. However, if the side surface of the seal ring groove or the inner circumferential surface of the housing is made of nonferrous metal such as aluminum, and if the seal ring is put under a severe sliding condition of PV (loaded pressure×velocity)=40 MPa·m/s or more, then a fiber edge protruding to the surface of the seal ring and fiber which has fallen off from the seal ring accelerate the abrasion of the nonferrous metal as the partner of the sliding, sometimes resulting in damage to the sealing property.

Accordingly, in the seal ring of the present invention, in order to achieve an improvement in the load-resistant property of the fluororesin, and simultaneously, in order to suppress the abrasion of the side surface of the ring or inner circumferential surface of the housing, which is the partner member made of soft nonferrous metal such as aluminum, modified fluororesin is compounded with fluororesin of the seal ring. The modified fluororesin is prepared by being irradiated with an ionizing radiation in a range from 1 kGy to 10 MGy inclusive in a state of being heated up to a melting point thereof or higher under an inert gas atmosphere with an oxygen partial pressure of 1.33 kPa or less. The fluororesin modified under the conditions has a bridged structure in molecular chains. Accordingly, it is possible to improve the abrasion-resistant property to a great extent by compounding the modified fluororesin with the conventional fluororesin.

Here, if the oxygen partial pressure in the inert gas atmosphere exceeds 1.33 kPa, then oxygen is bonded to the portion of the fluororesin, which is activated by the ionizing radiation, and thus a recombination reaction forming the above-described bridged structure is prone to inhibition.

Moreover, if an amount of the ionizing radiation is less than 1 kGy, then a partial decomposition reaction of the fluororesin becomes difficult to progress, and the bridged structure is difficult to form. Meanwhile, if the amount of the ionizing radiation exceeds 10 MGy, only the partial decomposition reaction of the fluororesin is progressed, and the formation of the bridged structure by the recombination reaction is prone to inhibition.

The modified fluororesin irradiated with the ionizing radiation is compounded, with respect to the total compounded amount of the fluororesin (sum of the fluororesin and the modified fluororesin), in a ratio ranging from 5 to 50% by volume inclusive, and preferably, in a ratio ranging from 10 to 30% by volume inclusive. If the compounded amount of the modified fluororesin is less than 5% by volume, the improving effect of the abrasion-resistant property of the fluororesin itself is not recognized. If the amount exceeds 50% by volume, it becomes difficult to mold the constituents into the seal ring.

Furthermore, because the fluororesin exhibits an oil repellent property due to smallness of its surface energy, the seal ring cannot retain the oil film of the sliding surface particularly under high surface pressure where the oil film is thinned. Therefore, the amounts of friction torque and self-abrasion are undesirably increased.

Accordingly, in the seal ring of the present invention, in order to improve the oil-film retention property of the seal ring made of the fluororesin, it is preferable that the following synthetic resin be compounded with the fluororesin serving as the base material of the seal ring. This synthetic resin is resin having a surface energy ranging from +0 N/cm to $20 \times 10^{-5}$ N/cm inclusive with respect to the surface energy of the operating oil to be hermetically sealed. With such compounding, the oil retention property of the sliding portions is improved, and thus it is made possible to slide the seal ring made of the fluororesin under high surface pressure.

Usually, in order to improve the oil-film retention property of the seal ring, minute unevenness is provided on the sliding surface thereof, grooves for retaining the oil film are set thereon. However, with regard to such minute unevenness and grooves, in a fluororesin-made seal ring manufactured by a molding method other than injection molding, it is necessary to add machine work after the molding. Therefore, a cost increase is incurred due to an increase of production processes. Further, as the sliding surface is being abraded, the oil-film retention performance thereof is lowered.

Regarding the above-described matter, in the present invention, the synthetic resin having the surface energy equivalent to or more than that of the operating oil to be hermetically sealed is added to the fluororesin. Therefore, an addition of the production process is eliminated. Moreover, even if the sliding surface is abraded, the oil-film retention performance is not lowered. Hence, it is made possible to ensure the oil film for a long period under conditions where high surface pressure is applied.

It is necessary for the synthetic resin used in the present invention to have a surface energy ranging from +0 N/cm to $20 \times 10^{-5}$ N/cm inclusive with respect to the surface energy of the operating oil. If synthetic resin having a surface energy out of the above-described range is compounded with the fluororesin, the improving effect of the oil retention property cannot be recognized under conditions where surface pressure more than 4 MPa is applied, and the abrasion of the seal ring itself is increased. The surface energy of general operating oil for an automatic transmission is approximately $30 \times 10^5$ N/cm, and it is preferable for the synthetic resin to have a surface energy more than this in order to generate wetness on the surface. However, if a difference in surface energy between the metal surface of the partner member and the synthetic resin exceeds $20 \times 10^{-5}$ N/cm, then formation of an even oil film on the sliding surface is prone to inhibition. Therefore, for the synthetic resin concerned, synthetic resin having a surface energy equal to or more than that of the operating oil, in which the difference in surface energy with the partner metal member is small, is suitable. As a synthetic resin material satisfying the conditions as described above, polyamideimide is the optimum. Moreover, in this case, it is desirable to use powder polyamideimide with a mean particle diameter ranging from 2 μm to 150 μm inclusive.

Moreover, it is preferable to compound the synthetic resin having the above-described predetermined surface energy with the seal ring of the present invention in a ratio ranging from 5 to 50% by volume inclusive, and more preferably, in a ratio ranging from 5 to 30% by volume inclusive with respect to the material constituting the seal ring.

If the ratio of the compounded amount of the synthetic resin is less than 5% by volume, the improving effect of wettability thereof with the above-described operating oil may sometimes not be obtained. If the ratio exceeds 50% by volume, then the friction torque of the sliding surface may sometimes be increased.

Although the present invention will be described below in more detail based on examples and comparative examples, the present invention is not limited to these examples.

EXAMPLE 1

For the fluororesin serving as the base material of the seal ring 10, tetrafluoroethylene with an excellent low friction torque property among fluororesins was used. The tetrafluoroethylene molding powder (G-163 made by Asahi Glass Company) was irradiated with an electron beam (acceleration voltage of 2 MeV) by exposure to 100 kGy under an atmosphere with an oxygen partial pressure of 0.133 kPa and a nitrogen partial pressure of 106.4 kPa and a heating condition of 350° C. Thus, modified fluororesin was produced. Then, this modified resin was milled by a jet mill until a mean particle diameter thereof reached approximately 20 μm. Next, the above-described modified fluororesin of 25% by volume was compounded with unmodified tetrafluoroethylene molding powder (G-163 made by Asahi Glass Company) of 55% by volume. Moreover, as the synthetic resin having the surface energy ranging from +0 N/cm to $20 \times 10^{-5}$ N/cm inclusive with respect to the surface energy of the operating oil, polyamideimide powder (TORLON 4203L made by Amoco; mean particle diameter: 15 μm) of 20% by volume was added to the compounded powder.

The polyamideimide was selected because, as shown in the following Table 1, it had a surface energy equal to or more than that of operating oil for an automatic transmission (Nissan genuine automatic transmission fluid Matic J made by Idemitsu Kosan Co., Ltd.) for use in an actual unit, and also, because a difference thereof in surface energy with an aluminum die-cast material that was being used as the shaft member of the automatic transmission was minimum.

TABLE 1

| Material | Surface energy ($10^{-5}$ N/cm) |
|---|---|
| Polytetrafluoroethylene (PTFE) | 19.3 |
| Polyetheretherketone (PEEK) | 45.3 |
| Polyamide 46 (PA46) | 40.2 |
| Polyethersulfone (PES) | 47.4 |
| Polyamideimide (PAI) | 31.8 |
| Aluminum die-cast material | 33.4 |
| Operating oil for automatic transmission (Nissan genuine automatic transmission fluid Matic J made by Idemitsu Kosan Co., Ltd.) | 30.5 |

The above-described powder compound was sufficiently mixed by a mixer, and was then processed by heat at 300° C. for 12 hours. Thus, high-temperature volatile components were removed. Next, the powder compound was pre-molded into a cylindrical shape under a molding pressure of 50 MPa. Thereafter, the pre-molded compound was baked in an electric furnace at a temperature ranging from 350 to 400° C. for 3 hours.

Figure 3:
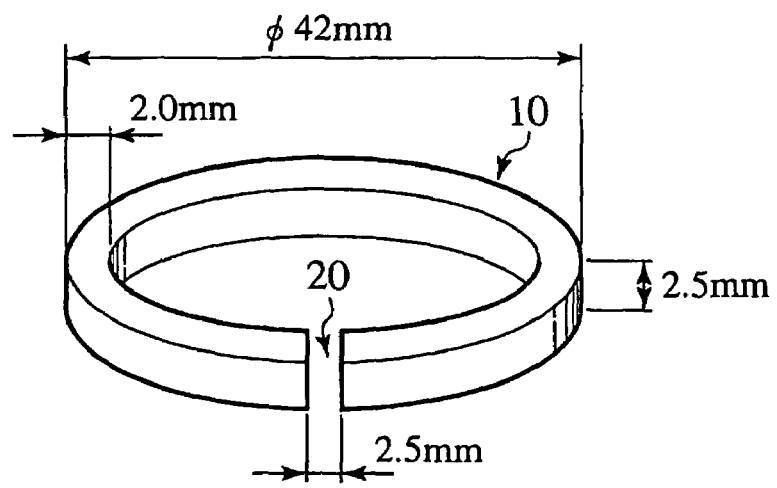
FIG. 3 is a perspective view showing a shape of the seal ring used in an abrasion test performed for confirming an improving effect in a sliding property of the seal ring of the present invention.

The fluororesin composition obtained by the baking was machined by a lathe into the seal ring 10 having the straight gap 20, which is illustrated in FIG. 3. Thus, the seal ring of this example was obtained.

COMPARATIVE EXAMPLE 1

Graphite powder (SGL with a particle diameter of 3 μm, made by SEC Corporation) of 21% by volume and carbon fiber (Kreca Chop M-2007S made by Kureha Chemical Industry Co., Ltd.) of 12% by volume, which had a diameter of 14.5 μm and a length of 90 μm, were added to unmodified tetrafluoroethylene molding powder (G-163 made by Asahi Glass Company) of 67% by volume. The above-described powder compound was mixed by a mixer, and then was pre-molded into a cylindrical shape under a molding pressure of 50 MPa. Thereafter, the pre-molded compound was baked in an electric furnace at a temperature ranging from 350 to 400° C. for 3 hours.

The fluororesin composition obtained by the baking was machined by a lathe into the seal ring 10 having the straight gap 20, which is illustrated in FIG. 3, and the seal ring of this example was obtained.

COMPARATIVE EXAMPLE 2

The modified fluororesin of Example 1 of 35% by volume was compounded with unmodified tetrafluoroethylene molding powder (G-163 made by Asahi Glass Company) of 65% by volume. The obtained compound was sufficiently mixed by a mixer, and was then processed by heat at 300° C. for 12 hours. Thus, high-temperature volatile components were removed. Next, the powder compound was pre-molded into a cylindrical shape under a molding pressure of 50 MPa, and thereafter, was baked in an electric furnace at a temperature ranging from 350 to 400° C. for 3 hours.

The fluororesin composition obtained by the baking was machined by a lathe into the seal ring 10 having the straight gap 20, which is illustrated in FIG. 3, and the seal ring of this example was obtained.

COMPARATIVE EXAMPLE 3

The modified fluororesin of Example 1 of 20% by volume was compounded with unmodified tetrafluoroethylene molding powder (G-163 made by Asahi Glass Company) of 50% by volume. Moreover, to the compounded powder, there were added, as metal powder, stainless steel flake powder (St-S400 mesh made by Fukuda Metal Foil & Powder Co., Ltd.) of 10% by volume, and as the synthetic resin having the surface energy ranging from +0 to $20 \times 10^{-5}$ N/cm inclusive with respect to the surface energy of the operating oil, polyamideimide powder (TORLON 4203L made by Amoco; mean particle diameter: 15 µm) of 20% by volume.

The powder obtained in the above-described manner was machined into the seal ring 10 under similar conditions to those of Example 1, and the seal ring of this example was obtained.

(Performance Evaluation)

Figure 4:
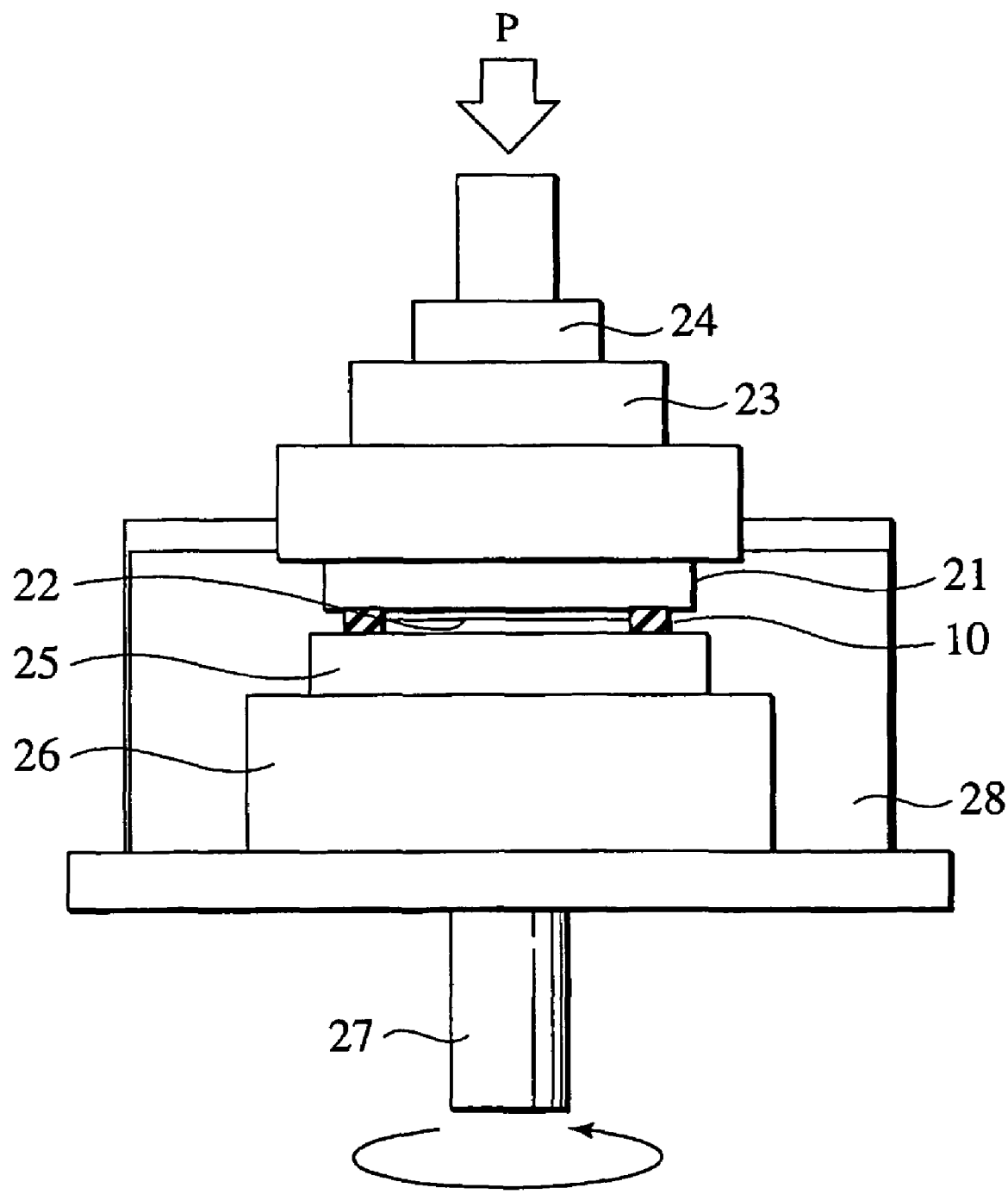
FIG. 4 is a schematic view of an abrasion test machine of a vertical ring-on-disc system, which is used in the abrasion test performed for confirming the improving effect in the sliding property of the seal ring of the present invention.

In order to confirm the improving effect of the sliding property of the present invention, an abrasion test was conducted in the operating oil for an automatic transmission (Nissan genuine automatic transmission fluid Matic J made by Idemitsu Kosan Co., Ltd.) 28 for the seal rings of Example 1 and Comparative examples 1 to 3 (refer to FIG. 4).

As a partner member, an aluminum die-cast material (ADC-12) that was being used for the shaft member 12 of the automatic transmission based on the demand for reduction in weight thereof in recent years was selected. Note that, for the aluminum die-cast material (ADC-12), one in conformity with JIS H5302 (ISO 3522) was used. Moreover, for installation to the test device, a test piece shape of the aluminum die-cast material was set in a diameter of 60 mm and a thickness of 10 mm, and this test piece was defined as a disc 25. Surface roughness of the slidingly contacting surface thereof was set approximately as: Ra=1 µm.

FIG. 4 schematically illustrates a friction and abrasion test machine of the vertical ring-on-disc system, which was used in this test. This test machine has a ring holder 21 on an upper portion thereof. The ring holder 21 fixes the seal ring 10 by thrusting the outer circumferential surface 17b against a groove portion of the holder by means of spring force of a snap ring 22 provided on the inner circumferential surface 17a side so as not to move in the diameter direction of the seal ring 10 during the sliding.

Meanwhile, a disc holder 26 coupled to the rotation shaft 27 is provided in a lower portion of the test machine. When the disc 25 is fixed to the disc holder 26 by bolts, the disc 25 freely rotates with respect to the seal ring 10. Next, the ring holder 21 is made to descend, and thus the seal ring 10 and the disc 25 are brought into a slidingly contacting relationship. Moreover, pressure P is applied to the seal ring 10 and the disc 25 from a direction of an axial line of the ring holder 21, and thus the seal ring 10 and the disc 25 are clamped together. At this time, the slidingly contacting portions of the seal ring 10 and the disc 25 are immersed in the operating oil (Nissan genuine automatic transmission fluid Matic J made by Idemitsu Kosan Co., Ltd.) 28. Note that a reference numeral 23 denotes a load cell, and a reference numeral 24 denotes a torque detector.

Figure 5:
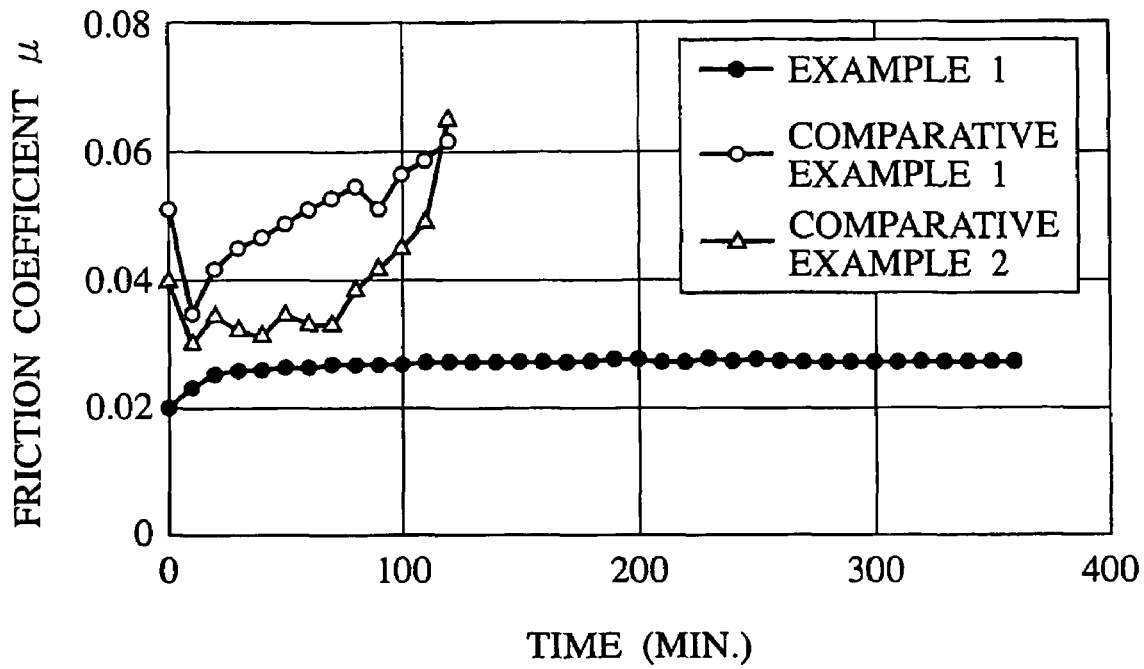
FIG. 5 is a graph showing changes with time of friction coefficients in Test condition 1.

First, by use of the above-described test machine, a sliding test was performed for the seal rings of Example 1 and Comparative examples 1 and 2 under Test condition 1 (where a clamped surface pressure was 5 MPa, friction speed was 10 m/sec., and a test time was 6 hours). FIG. 5 shows changes with time of friction coefficients under Test condition 1, and FIG. 6 shows abrasion amounts of the seal ring 10 and the disc 25 after the sliding test.

As shown in FIG. 5, in Example 1 of the present invention, variations and absolute values of the friction coefficient during the sliding test are small, and Example 1 exhibits a good sliding property for the aluminum-made disc 25. Meanwhile, in each of Comparative examples 1 and 2, the improvements of the abrasion-resistant and load-resistant properties of the seal ring 10 are insufficient with respect to the sliding test conditions. Therefore, an abnormal abrasion of the seal ring 10 occurs during the test, and the friction coefficient rapidly increases. By comparing Example 1 with Comparative examples 1 and 2, it can be confirmed that, in Example 1, the addition of polyamideimide improves an oil holding property, and thus a swing property is improved to a great extent.

Figure 6:
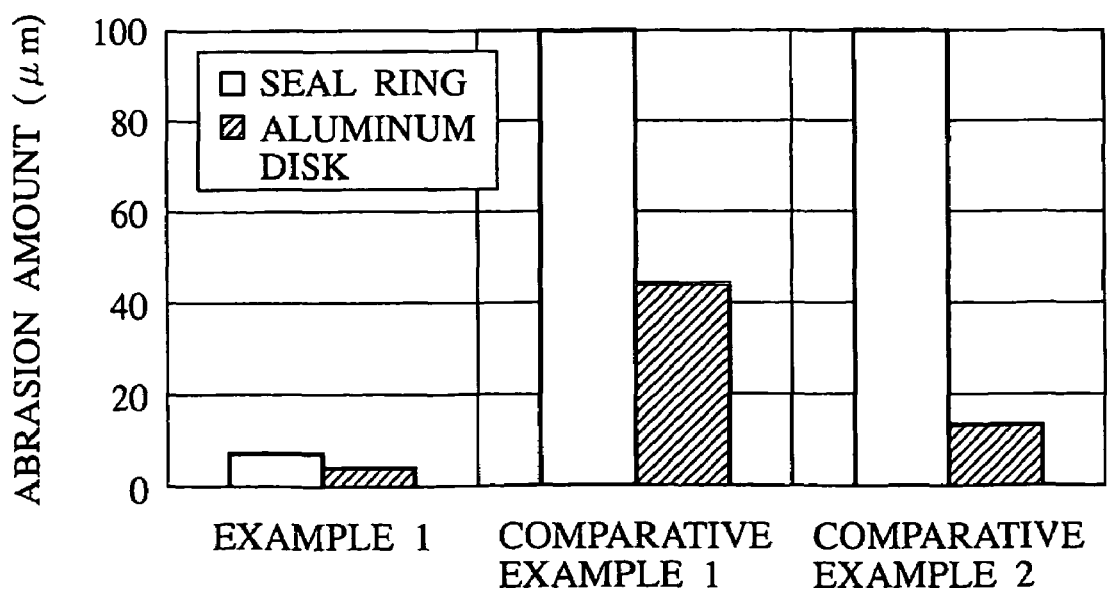
FIG. 6 is a graph showing abrasion amounts of seal rings and discs after an abrasion test in Test condition 1.

Because Example 1 of the present invention exhibits a good sliding property for the aluminum material under Test condition 1, the abrasion amounts of the disc 25 and the seal ring 10 are small in this example as shown in FIG. 6. Meanwhile, in each of Comparative examples 1 and 2, the improvements of the abrasion-resistant and load-resistant properties of the ring are insufficient. Therefore, the abnormal abrasion of the seal ring 10 occurs during the test, and an abrasion depth of the ring reaches 1000 µm or more.

Moreover, in Comparative example 1 where the carbon fiber was added, the carbon fiber protruding from the sliding surface of the seal ring 10 abrades the aluminum disc 25 as the partner member. Therefore, not only the abrasion amount of the seal ring 10 but also the abrasion amount of the aluminum disc 25 was increased.

Note that, when the seal ring of Comparative example 3, with which the stainless steel flake powder was compounded, was also subjected to the sliding test under the above-described Test condition 1, the seal ring of this example exhibits a good sliding property for the aluminum-made disc 25. In addition, the abrasion-resistant property of the ring is improved to a great extent. Therefore, no abrasion was recognized in the ring (abrasion depth: 0 µm).

Figure 7:
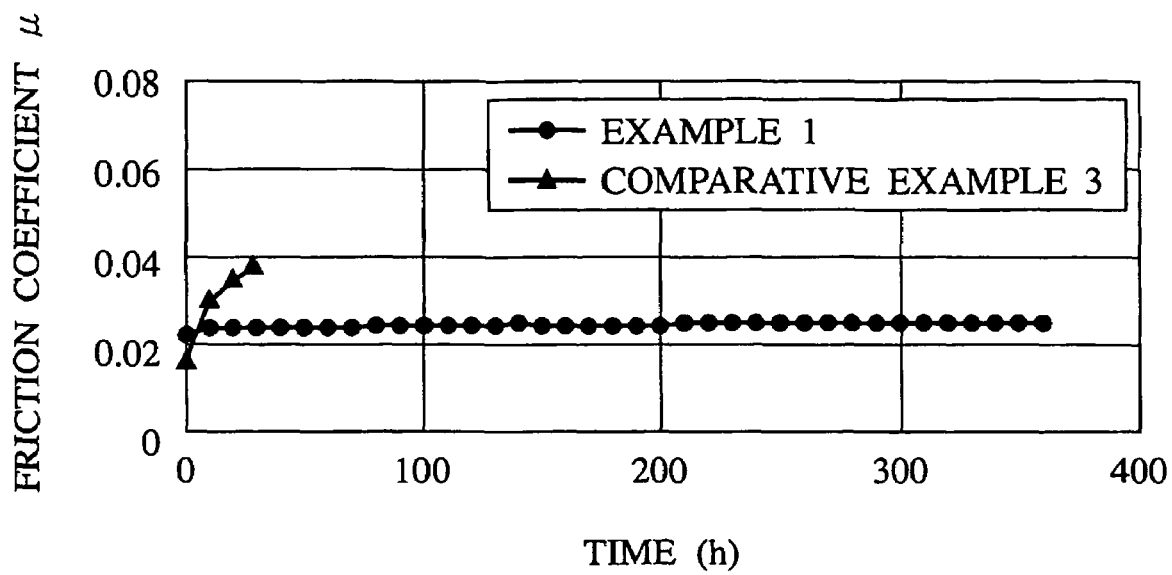
FIG. 7 is a graph showing changes with time of friction coefficients in Test condition 2.

Next, in order to clarify that Example 1 is superior, a sliding test was conducted only for Example 1 and Comparative example 3 under Text condition 2 where a contact surface pressure was increased (where a clamped surface pressure was 8 MPa, friction speed was 10 m/sec., and a test time was 6 hours). FIG. 7 shows changes with time of friction coefficients under Test condition 2.

As shown in FIG. 7, in Example 1, the variations and absolute values of the friction coefficient during the sliding test are small also under Test condition 2, and Example 1 exhibits a good sliding property for the aluminum-disc 25. On the contrary to this, in Example 3, the friction coefficient was increased with the elapse of a test time, and in 40 minutes from the start of the test, the abrasion amount of the ring reached approximately 1000 µm. Accordingly, the test was discontinued. As described above, it is recognized that, in Comparative example 3, the stainless steel flake powder provided with no self-lubricating property causes an increase of the friction coefficient under high surface pressure, temperature of the sliding surface rises with the elapse of the test time, and thus the abrasion of the seal ring is accelerated.

Figure 8:
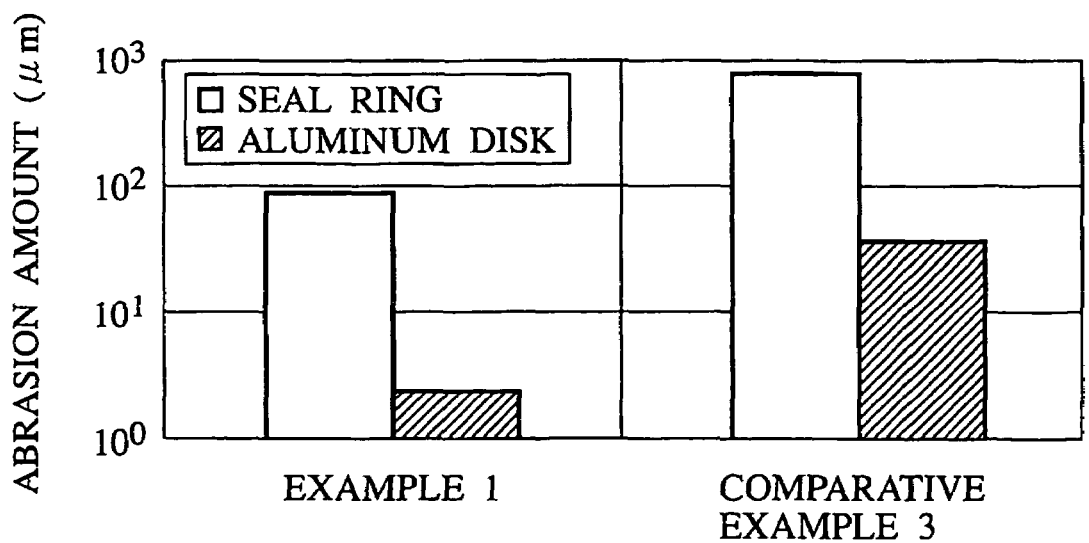
FIG. 8 is a graph showing abrasion amounts of seal rings and discs after an abrasion test in Test condition 2.

FIG. 8 shows abrasion amounts of the seal ring 10 and the disc 25 after the sliding test. In Example 1, though the ring looks like being abraded to approximately 100 µm, this is not the abrasion but is one caused by creep deformation. For this reason, the abrasion of the ring is also slight in Example 1. Meanwhile, in Comparative example 3, an abnormal abrasion of the ring occurs with an increase of the friction coefficient. In addition, the abnormal abrasion of the ring accelerates the abrasion of the aluminum.

As described above, in the present invention, to the seal ring made of the fluororesin, there are added the synthetic resin having the surface energy larger than the surface energy of the operating oil, and added the modified fluororesin composed by being irradiated with the ionizing radiation in the predetermined range under the inert gas atmosphere in the state of being heated up to the melting point thereof or higher. Therefore, even if the partner member of the sliding is nonferrous metal such as an aluminum alloy, aggression of the seal ring to the partner member is reduced, and the good sealing property can be maintained. In addition, it is possible to reduce the friction torque on the sliding surface to the possible minimum. Consequently, an extremely excellent effect that it is possible to contribute to the improvement of fuel consumption of the automobile is brought.

The entire content of Japanese Patent Applications No. P2003-344103 with a filing date of Oct. 2, 2003 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

INDUSTRIAL APPLICABILITY

According to the present invention, it is possible to improve the sliding property only by changing the filler material of the seal ring, and accordingly, it is unnecessary to change a basic design and manufacturing equipment of the seal ring itself. Therefore, an advantage in that the sliding property can be improved at low cost is obtained.

The invention claimed is:

1. A seal ring which seals operating oil hermetically and is attached to an annular seal ring groove provided on an outer circumference of a shaft member, the seal ring comprising:
    fluororesin;
    modified fluororesin formed by being irradiated with an ionizing radiation in a range from 1 kGy to 10 MGy inclusive in a state of being heated up to a melting point thereof or higher under an inert gas atmosphere with an oxygen partial pressure of 1.33 kPa or less; and
    synthetic resin having a surface energy ranging from +0 N/cm to $20 \times 10^{-5}$ N/cm inclusive of that of an operating oil,
        wherein the seal ring comprises an inner ring circumferential surface facing an inside thereof in a radius direction, an outer ring circumferential surface facing an outside thereof in the radius direction, and a pair of side ring surfaces facing both sides thereof in an axial direction, and
        wherein when oil pressure is applied to the seal ring, the outer ring circumferential surface is pressed against an inner circumferential surface of a housing, and one of the pair of side ring surfaces is pressed against a side surface of the seal ring groove, thus retaining the oil pressure.

2. A seal ring according to claim 1, wherein a ratio of the modified fluororesin to a total amount of the fluororesin and the modified fluororesin ranges from 5 to 50% by volume inclusive.

3. A seal ring according to claim 1, wherein a compounding ratio of the synthetic resin to a material constituting the seal ring ranges from 5 to 50% by volume inclusive.

4. A seal ring according to claim 1, wherein the synthetic resin is polyamideimide.

5. A seal ring according to claim 4, wherein the polyamideimide is used as powder with a mean particle diameter ranging from 2 μm to 150 μm inclusive.

6. A seal ring according to claim 1, wherein the seal ring is used for a hydraulic seal for relatively rotating portions in an automatic transmission for a vehicle.

7. A hydraulic seal device, comprising:
    a shaft member;
    a housing which houses the shaft member; and
    a seal ring which seals operating oil hermetically and is attached to an annular seal ring groove provided on an outer circumference of the shaft member,
    the seal ring, comprising:
    fluororesin;
    modified fluororesin formed by being irradiated with an ionizing radiation in a range from 1 kGy to 10 MGy inclusive in a state of being heated up to a melting point thereof or higher under an inert gas atmosphere with an oxygen partial pressure of 1.33 kPa or less; and
    synthetic resin having a surface energy ranging from +0 N/cm to $20 \times 10^{-5}$ N/cm inclusive of that of an operating oil,
        wherein the seal ring comprises an inner ring circumferential surface facing an inside thereof in a radius direction, an outer ring circumferential surface facing an outside thereof in the radius direction, and a pair of side ring surfaces facing both sides thereof in an axial direction, and
        wherein when oil pressure is applied to the seal ring, the outer ring circumferential surface is pressed against an inner circumferential surface of the housing, and one of the pair of side ring surfaces is pressed against a side surface of the seal ring groove, thus retaining the oil pressure, and the seal ring slidingly contacts any side surface of the seal ring groove of the shaft member which is nonferrous metal and the inner circumferential surface of the housing which is nonferrous metal.

* * * * *